(12) United States Patent
Ciarcia

(10) Patent No.: US 9,147,287 B2
(45) Date of Patent: *Sep. 29, 2015

(54) STATISTICAL POINT PATTERN MATCHING TECHNIQUE

(71) Applicant: Eagle View Technologies, Inc., Bothell, WA (US)

(72) Inventor: Christopher Albert Ciarcia, Monroe, WA (US)

(73) Assignee: Eagle View Technologies, Inc., Bothell, WA (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/844,572

(22) Filed: Mar. 15, 2013

(65) Prior Publication Data

US 2014/0212026 A1 Jul. 31, 2014

Related U.S. Application Data

(60) Provisional application No. 61/759,251, filed on Jan. 31, 2013.

(51) Int. Cl.
*G06K 9/48* (2006.01)
*G06T 17/05* (2011.01)
(Continued)

(52) U.S. Cl.
CPC . *G06T 17/05* (2013.01); *G06K 9/48* (2013.01); *G06K 9/6211* (2013.01); *G06T 7/0065* (2013.01); *G06K 2009/487* (2013.01); *G06T 2200/08* (2013.01); *G06T 2207/10032* (2013.01);
(Continued)

(58) Field of Classification Search
None
See application file for complete search history.

(56) References Cited

U.S. PATENT DOCUMENTS 6,741,757 B1 * 5/2004 Torr et al. .................. 382/294
8,078,436 B2 12/2011 Pershing et al.
8,088,436 B2 1/2012 Gao et al.
(Continued)

FOREIGN PATENT DOCUMENTS

WO 2011/152895 A2 12/2011
WO 2012/037157 A2 3/2012
(Continued)

OTHER PUBLICATIONS

Ciarcia et al., "Systems and Methods for Point-To-Point Registration Using Perspective Imagery From Independent Sources Without Image Acquistion Metadata," U.S. Appl. No. 61/849,842, filed Oct. 5, 2012, 41 pages.
(Continued)

*Primary Examiner* — Siamak Harandi
(74) *Attorney, Agent, or Firm* — Seed IP Law Group PLLC

(57) ABSTRACT

A statistical point pattern matching technique is used to match corresponding points selected from two or more views of a roof of a building. The technique statistically selecting points from each of orthogonal and oblique aerial views of a roof. generating radial point patterns for each aerial view, calculating the origin of each point pattern, representing the shape of the point pattern as a radial function, and Fourier-transforming the radial function to produce a feature space plot. A feature profile correlation function can then be computed to relate the point match sets. From the correlation results, a vote occupancy table can be generated to help evaluate the variance of the point match sets, indicating, with high probability, which sets of points are most likely to match one another.

16 Claims, 13 Drawing Sheets

(51) Int. Cl.
*G06K 9/62* (2006.01)
*G06T 7/00* (2006.01)

(52) U.S. Cl.
CPC ............... *G06T 2207/20076* (2013.01); *G06T 2207/30184* (2013.01)

(56) References Cited

U.S. PATENT DOCUMENTS

| | | | |
|---|---|---|---|
| 8,145,578 | B2 | 3/2012 | Pershing et al. |
| 8,170,840 | B2 | 5/2012 | Pershing |
| 8,209,152 | B2 | 6/2012 | Pershing |
| 8,588,547 | B2 | 11/2013 | Giuffrida et al. |
| 8,630,510 | B2 | 1/2014 | Giuffrida et al. |
| 8,649,632 | B2 | 2/2014 | Neophytou et al. |
| 8,805,058 | B2 | 8/2014 | Zebedin |
| 8,811,720 | B2 | 8/2014 | Seida |
| 2004/0258327 | A1 | 12/2004 | Cheatle et al. |
| 2010/0114537 | A1* | 5/2010 | Pershing ............ 703/1 |
| 2012/0191424 | A1 | 7/2012 | Pershing |
| 2013/0346020 | A1 | 12/2013 | Pershing |
| 2014/0046627 | A1 | 2/2014 | Pershing |
| 2014/0099035 | A1 | 4/2014 | Ciarcia |

FOREIGN PATENT DOCUMENTS

| | | |
|---|---|---|
| WO | 2012/103193 A1 | 8/2012 |
| WO | 2014055953 A2 | 4/2014 |

OTHER PUBLICATIONS

Ciarcia et al., "Systems and Methods for Relating Images to Each Other by Determining Transforms Without Using Image Acquisition Metadata," U.S. Appl. No. 14/046,702, filed Oct. 4, 2013, 40 pages.

Zhang et al., "A comparative study of curvature scale space and Fourier descriptors for shape-based image retrieval," *J. Vis. Commun. Image R. 14*: 41-60, 2003.

International Search Report and Written Opinion, mailed Aug. 18, 2014, for corresponding International Application No. PCT/US2014/014274, 11 pages.

* cited by examiner

Fig. 11

STATISTICAL POINT PATTERN MATCHING TECHNIQUE

CROSS REFERENCE TO RELATED APPLICATIONS

This patent application claims benefit of U.S. Provisional Patent Application No. 61/759,251 filed Jan. 31, 2013, which is hereby incorporated by reference in its entirety.

BACKGROUND

1. Field of the Invention

This disclosure relates generally to a computer-based method of rendering an image of a three-dimensional structure from several views of the structure. In particular, the computer-based method for creating a roof model relies upon a statistical method of point pattern matching on an aerial top plan view and one or more aerial perspective views of the roof.

2. Description of the Related Art

The building and insurance industries have historically relied on human beings to evaluate roofs in person, to determine labor and materials needed for repair or replacement. Sending a claims adjuster or a roofing specialist out to each individual property can be time-consuming and costly, especially when many buildings need to be evaluated, for instance, following natural disasters such as hurricanes, floods, hail storms, and the like. Furthermore, a human being standing on the ground can only give a rough estimate of the sizes of roof features, as opposed to obtaining actual measurements. As a result, estimates can be inaccurate.

Recently, imaging and mapping technologies have made possible computer-based calculations of roof dimensions from aerial photographs. A top plan view ("orthogonal") looking straight down from above, together with one or more different perspective views ("oblique") looking at an angle from, for example, the north, south, east, or west directions, can be sufficient to generate a three-dimensional (3D) reconstruction depth model of the roof structure. Such a model can include three-dimensional roof features such as dormers, gables, hips, and the like. Accurate measurements can then be made from the 3D model. Such methods pertaining to roofs are described in U.S. Pat. Nos. 8,088,436 and 8,170,840. Furthermore, there are many techniques known in the art for generation of 3D models of structures from multiple perspective images. Such 3D architectural images have many applications in the building industry.

In the generation of a 3D roof model, combining information from orthogonal and oblique views of the roof entails an initial step of point matching. First, a set of points is identified on each view to represent the shape of the roof, and then corresponding points from each view are matched. Usually the points are at locations where the roof lines merge. Human beings can easily recognize and associate points from the orthogonal view that match points on the oblique view. For example, it is easy for a human being to identify which are the highest points on either view of the roof, and which points are the lowest. However, requiring human intervention to perform the step of point matching precludes achieving a fully computer-generated model. When many roof models need to be processed, it is inefficient and cumbersome to interrupt a computerized process to obtain a human-generated data set, and then resume the computerized process.

Unfortunately, computerized point matching algorithms for performing such a task tend to be complex and exhaustive. For example, if N=20 points are identified on an orthogonal view of a roof and M=10 points are identified on an oblique view of the roof, if all possible permutations are considered, nearly 200,000 potential point match sets must be evaluated to complete the step of point matching. Thus, a more efficient method of computer-based point matching is desirable.

SUMMARY

A statistical point pattern matching technique can be used to narrow down the full set of point match set permutations by assigning probabilities to the point match sets, so that it is not necessary to evaluate all possible matches. By applying a variational analysis algorithm, a computational system can estimate which point combinations are most likely to match each other without using either a predetermined or an interactive threshold specification. Applying such a variational analysis to, for example, a 20×10 point set can reduce the number of permutations evaluated from about 200,000 to about 20, with a matching error of only about 1%. In a study of 127 different roofs, the average match time to complete the statistical point pattern matching method was about 20 seconds.

The statistical point pattern matching technique includes statistically selecting points from each of the orthogonal and oblique aerial views, generating radial point patterns for each aerial view, calculating the origin of each point pattern, representing the shape of the point pattern as a radial function, and Fourier-transforming the radial function to produce a feature space plot. A feature profile correlation function can then be computed to relate the point match sets. From the correlation results, a vote occupancy table can be generated to help evaluate the variance of the point match sets, indicating which sets of points most likely match each other.

The systems and methods for point pattern matching as described herein may be used as part of, in combination with, or in conjunction with, various processes for generating 3D models of building structures, such as roofs, from orthogonal and oblique perspective imagery. The systems and methods for point pattern matching as described herein may also be applicable to processes for generating 3D models of other types of structures other than building structures.

BRIEF DESCRIPTION OF THE DRAWINGS

FIG. 11 is a table showing point match sets of orthogonal and oblique point indices shown in FIG. 1 and FIG. 2, and their calculated association probabilities, according to one embodiment.

DETAILED DESCRIPTION

Embodiments described herein provide enhanced computer- and network-based methods, techniques, and systems for point pattern matching computation for handling variant density data within obscured non-linear deformed orthogonal and oblique perspective imagery of a structure of a building.

Figure 1:
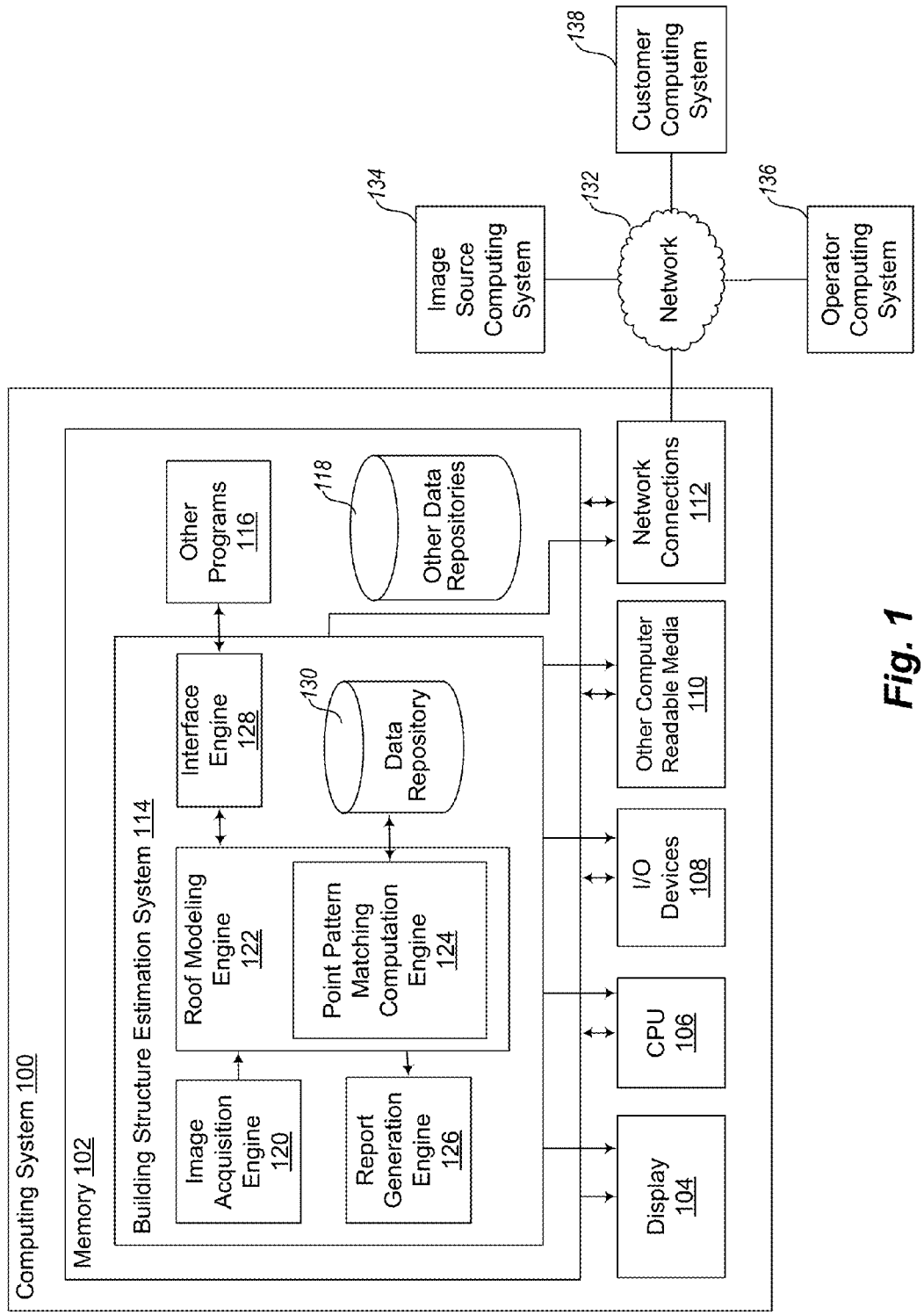
FIG. 1 is an exemplary block diagram of a computing system for practicing embodiments of the statistical point pattern matching method described herein, and for practicing embodiments of a building structure estimation system based on the point pattern matching.

FIG. 1 is an example block diagram of a computing system 100 for practicing embodiments of the statistical point pattern matching method described herein, and for practicing embodiments of a building structure estimation system that can include, as a component, the point pattern matching method described herein.

One or more general purpose or special purpose computing systems may be used to implement the computer- and network-based methods, techniques, and systems for point pattern matching computation described herein and for practicing embodiments of a building structure estimation system based on the point pattern matching. More specifically, the computing system 100 may comprise one or more distinct computing systems present at distributed locations. In addition, each block shown may represent one or more such blocks as appropriate to a specific embodiment or may be combined with other blocks. Moreover, in one example embodiment, the various components of a building structure estimation system 114 may physically reside on one or more machines, which use standard inter-process communication mechanisms (e.g., TCP/IP) to communicate with each other. Further, the building structure estimation system 114 may be implemented in software, hardware, firmware, or in some combination to achieve the capabilities described herein.

In the embodiment shown, the computing system 100 comprises a computer memory ("memory") 102, a display 104, one or more Central Processing Units ("CPU") 106, Input/Output devices 108 (e.g., keyboard, mouse, joystick, track pad, CRT or LCD display, and the like), other computer-readable media 110, and network connections 112. A building structure estimation system 114 is shown residing in the memory 102. In other embodiments, some portion of the contents, some of, or all of the components of the building structure estimation system 114 may be stored on and/or transmitted over the other computer-readable media 110. The components of the building structure estimation system 114 preferably execute on one or more CPUs 106 and generate roof estimate reports, as described herein. Other code or programs 116 (e.g., a Web server, a database management system, and the like) and potentially other data repositories, such as data repository 118, also reside in the memory 102, and preferably execute on one or more CPUs 106. Not all of the components in FIG. 1 are required for each implementation. For example, some embodiments embedded in other software do not provide means for user input, for display, for a customer computing system, or other components.

In a typical embodiment, the building structure estimation system 114 includes an image acquisition engine 120; a roof modeling engine 122; a point pattern matching computation engine 124 within, or as part of, the roof modeling engine 122; a report generation engine 126, an interface engine 128, and a data repository 130. Other and/or different modules may be implemented. In addition, the building structure estimation system 114 interacts via a communication system 132 with an image source computing system 134, an operator computing system 136, and/or a customer computing system 138. Communication system 132 may utilize one or more protocols to communicate via one or more physical networks, including local area networks, wireless networks, dedicated lines, internets, the Internet, and the like.

The image acquisition engine 120 performs at least some of the functions described herein, with respect to the processes described herein. In particular, the image acquisition engine 120 interacts with the image source computing system 134 to obtain one or more images of a building, and stores those images in the building structure estimation system data repository 130 for processing by other components of the building structure estimation system 114.

The roof modeling engine 122 performs at least some of the functions described with reference to FIGS. 2-13 below. In particular, the roof modeling engine 122 generates a model based on one or more images of a building that are obtained from the building structure estimation system data repository 130 or directly from the image source computing system 134. As noted, model generation may be performed semi-automatically, based on at least some inputs received from the operator computing system 136.

In addition, at least some aspects of the model generation may be performed automatically. In particular, to generate a 3D model, the roof modeling engine 122 may use output from the point pattern matching computation engine 124 which employs variational analysis to compute a point-to-point probability spread function. The point-to-point probability spread function can be used to estimate which individual points on one image of the building most likely match corresponding points on another image of the building (i.e., the point pattern matching computation engine endeavors to "optimize" point matching associations). This estimation may be based on adaptive predominance voting probabilities generated from shape pattern matches. The shape pattern matches can be created by comparing combinations of points on an orthogonal view of the building with specific other points on an oblique view of the building, and as further described herein.

These automated and semi-automated techniques are further described with respect to FIGS. 2-13 below. After the roof modeling engine 122 generates a model, it can store the generated model in the building structure estimation system data repository 130 for further processing by other components of the building structure estimation system 114.

The report generation engine 126 generates roof reports based on models stored in the building structure estimation system data repository 130. Generating a roof report may include preparing one or more views of a 3D model of the roof, annotating those views with indications of various characteristics of the model, such as dimensions of roof features (e.g., ridges, valleys, gables, hips, and the like), slopes of sections of the roof, calculated surface areas of sections of the roof, etc. In some embodiments, the report generation engine 126 facilitates transmission of roof measurement information that may or may not be incorporated into a roof estimate report. For example, the report generation engine 126 may transmit roof measurement information based on, or derived from, models stored in the building structure estimation system data repository 130. Such roof measurement information may be provided to, for example, third-party systems that generate roof estimate reports based on the provided information.

The interface engine 128 provides a view and a controller that facilitate user interaction with the building structure estimation system 114 and its various components. For example, the interface engine 128 may implement a user interface engine. The display 104 may provide an interactive graphical user interface (GUI) that can be used by a human user operating the operator computing system 136 to interact with, for example, the roof modeling engine 122, to perform functions such as specifying regions of interest for automated roof detection, specifying and/or identifying specific points on images of buildings, etc. In at least some embodiments, access to the functionality of the interface engine 128 is provided via a Web server, possibly executing as one of the other programs 116.

In some embodiments, the interface engine 128 provides programmatic access to one or more functions of the building structure estimation system 114. For example, the interface engine 128 provides a programmatic interface (e.g., as a Web service, static or dynamic library, etc.) to one or more roof estimation functions of the building structure estimation system 114 that may be invoked by one of the other programs 116 or some other module. In this manner, the interface engine 414 facilitates the development of third-party software, such as user interfaces, plug-ins, adapters (e.g., for integrating functions of the building structure estimation system 114 into desktop applications, Web-based applications, mobile device applications, embedded applications, etc.), and the like. In addition, the interface engine 128 may be, in at least some embodiments, invoked or otherwise accessed via remote entities, such as the operator computing system 136, the image source computing system 134, and/or the customer computing system 138, to access various roof estimation functionality of the building structure estimation system 114.

The building structure estimation system data repository 130 stores information related to the roof estimation functions performed by the building structure estimation system 114. Such information may include image data, model data, and/or report data. Furthermore, the data repository 130 may include information related to automatic roof detection and/or image registration. Such information includes, for example, historical image data. In addition, the building structure estimation system data repository 130 may include information about customers, operators, or other individuals or entities associated with the building structure estimation system 114.

In an example embodiment, components/modules of the building structure estimation system 114 can be implemented using standard programming techniques. For example, the building structure estimation system 114 may be implemented as a "native" executable running on the CPU 106, along with one or more static or dynamic libraries. In other embodiments, the building structure estimation system 114 can be implemented as instructions processed by a virtual machine that executes as one of the other programs 116. In general, a range of programming languages known in the art may be employed for implementing such example embodiments, including representative implementations of various programming language paradigms, including but not limited to, object-oriented languages (e.g., Java, C++, C#, Matlab, Visual Basic.NET, Smalltalk, and the like), functional languages (e.g., ML, Lisp, Scheme, and the like), procedural languages (e.g., C, Pascal, Ada, Modula, and the like), scripting languages (e.g., Perl, Ruby, Python, JavaScript, VBScript, and the like), and declarative languages (e.g., SQL, Prolog, and the like).

The embodiments described above may also use well-known synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments execute concurrently and asynchronously, and communicate using message passing techniques. Equivalent synchronous embodiments are also supported by a building structure estimation system implementation. Also, other functions could be implemented and/or performed by each component/module, and in different orders, and by different components/modules, yet still achieve the functions of the building structure estimation system 114.

In addition, programming interfaces to the data stored as part of the building structure estimation system 114, such as in the building structure estimation system data repository 130, can be available by standard mechanisms such as through C, C++, C#, and Java APIs; libraries for accessing files, databases, or other data repositories; through scripting languages such as XML; or through Web servers, FTP servers, or other types of servers providing access to stored data. For example, the building structure estimation system data repository 130 may be implemented as one or more database systems, file systems, memory buffers, or any other technique for storing such information, or any combination of the above, including implementations using distributed computing techniques.

Also, the example building structure estimation system 114 can be implemented in a distributed environment comprising multiple, even heterogeneous, computer systems and networks. For example, in one embodiment, the image acquisition engine 120, the roof modeling engine 122, the report generation engine 126, the interface engine 128, and the data repository 130 are all located in physically different computer systems. In another embodiment, various modules of the building structure estimation system 114, including the point pattern matching computation engine 124, are hosted each on a separate server machine and are remotely located from the tables which are stored in the data repository 130. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like).

Furthermore, in some embodiments, some or all of the components of the building structure estimation system 114 are implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 2:
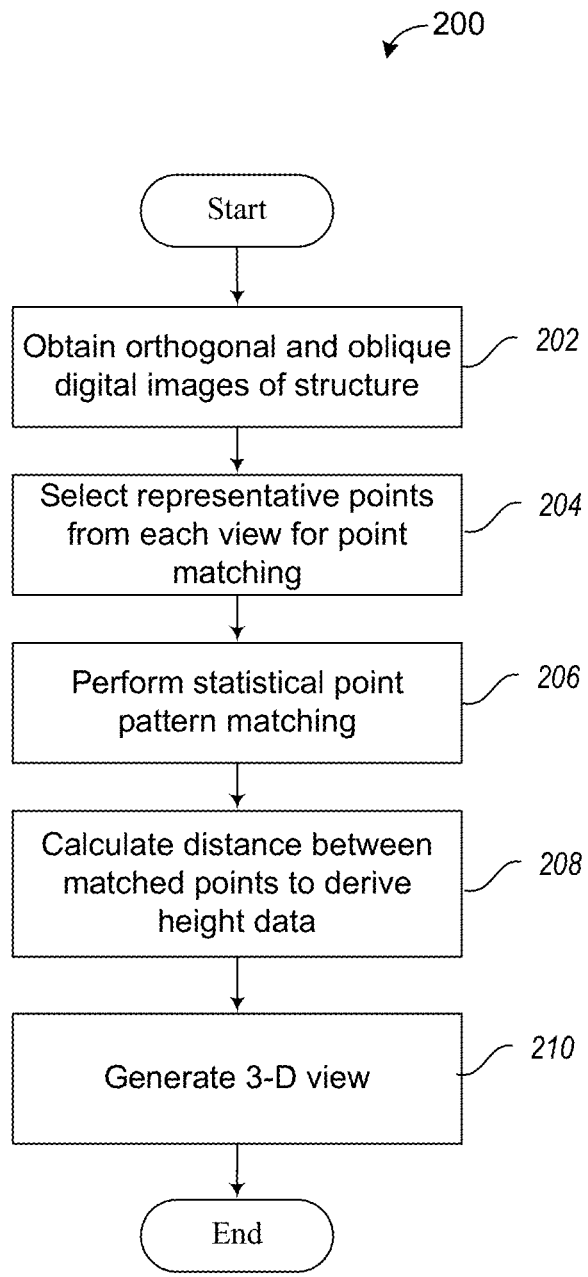
FIG. 2 is an exemplary flow diagram of a method of generating a 3D model of a roof using the statistical point pattern matching method described herein.

FIG. 2 shows a high-level computer-based method of obtaining a three dimensional (3D) reconstruction depth model of a structure from two or more 2D image views of the structure, according to one embodiment. Such a method can be carried out by the building structure estimation system 114 to construct a 3D model of a roof structure from two or more aerial images of the roof, taken from different perspectives.

At 202, the image acquisition engine 120 acquires two or more 2D image views of the roof. The images can be, for example, aerial images, satellite images, or ground-based images that are produced by a digital camera or that are digitized from images captured on film. Images can be acquired from a database, for example, a Google Earth™ database of satellite images, or a Google Maps™ database of ground-based images. Or, images can be expressly gathered for the purposes described herein.

At 204, the point pattern matching computation engine 124 selects representative points (x, y) from each view for point matching.

At 206, the point pattern matching computation engine 124 performs statistical point pattern matching to align the multiple views. Point pattern matching associates similar points within multiple images of the structure from different perspectives.

At 208, the roof modeling engine 122 calculates a distance between matched points to derive height data (z).

At 210, the roof modeling engine 122 can apply a perspective transformation to generate a 3D view of the roof from the calculated (x,y,z) coordinates.

Once the 3D coordinates of the matched points are known, it is possible to compute accurate spatial dimensions (measurements) of each of the roof segments. Such measurements can then be sent to the report generation engine 126 for inclusion in a roof report that can be sold to an insurance adjuster, homeowner, builder, or roofing contractor, for example.

Figure 3:
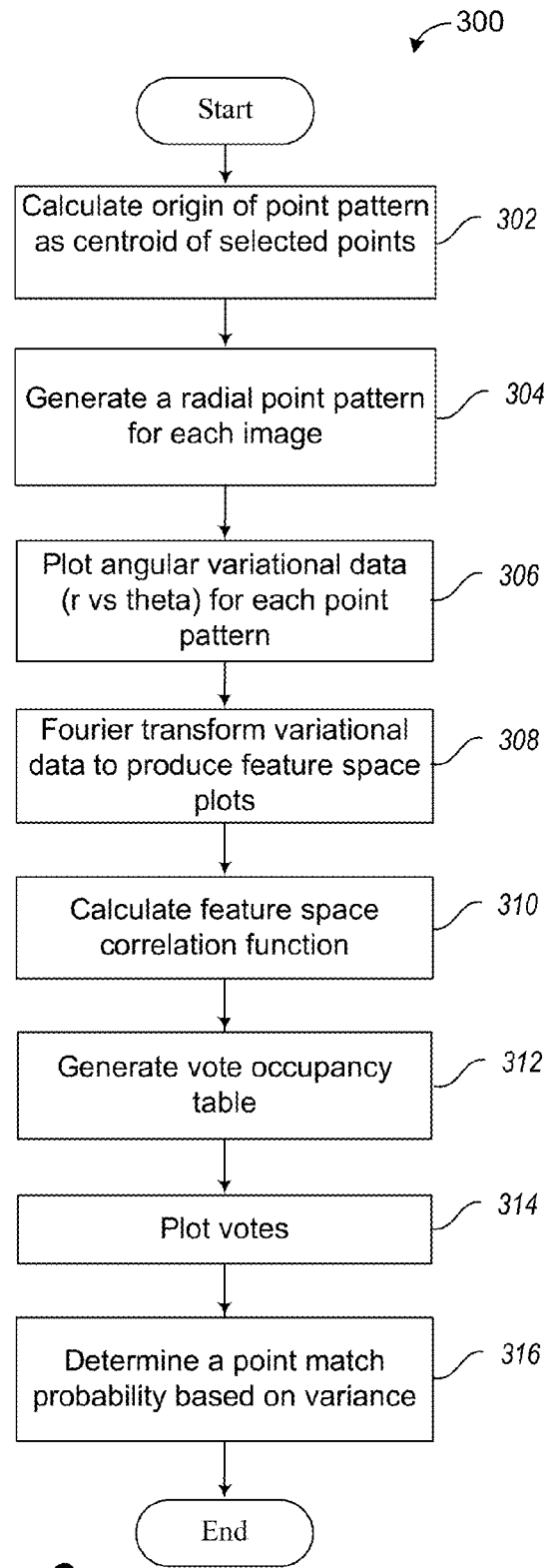
FIG. 3 is an exemplary flow diagram of a statistical method of point pattern matching, according to one embodiment.

FIG. 3 shows a computer-based, statistical method of point pattern matching 300, as described herein, that can be carried out by the point pattern matching computation engine 124. Steps of the method are illustrated in greater detail in FIGS. 4-13 as described below.

At 302, radial point patterns are generated for each of the images obtained of the structure of interest from the image acquisition engine 120.

Figure 4:
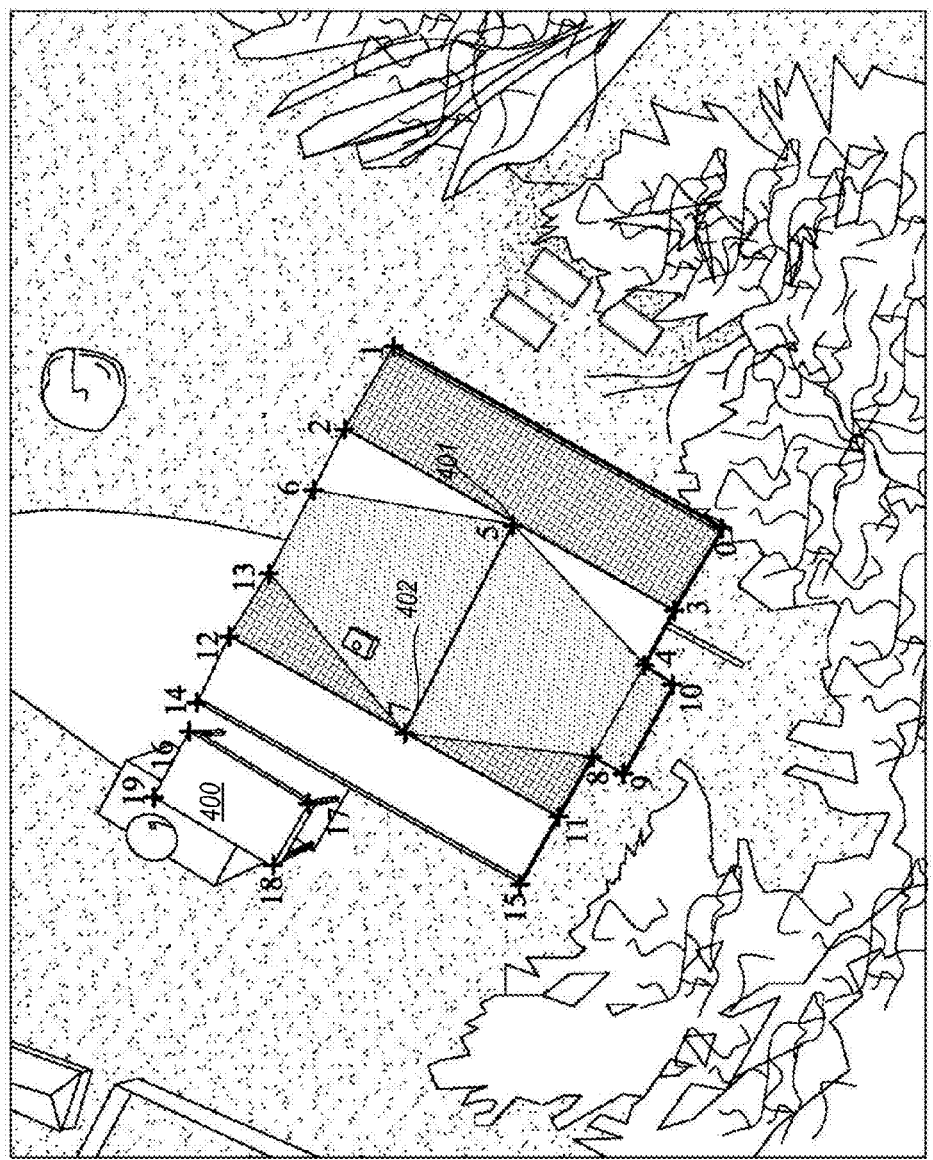
FIG. 4 is a top plan (orthogonal) view of an exemplary roof derived from an aerial photograph, showing identification of exemplary orthogonal point assignments represented by numerals.

FIG. 4 shows a substantially orthogonal view 350 of an exemplary building roof, on which are indicated twenty orthogonal points having point index numbers 0 through 19. Point assignments may favor locations at which various roof lines converge. For example, points 5 and 7 are both located at what appears to be the top of a gable, where four roof lines converge. A carport 400 serves as a landmark that can be used to quickly identify the two ends of the roof. It is noted that the roof location of point 5 (401) is farther from the carport 400 than is the roof location of point 7 (402).

Figure 5:
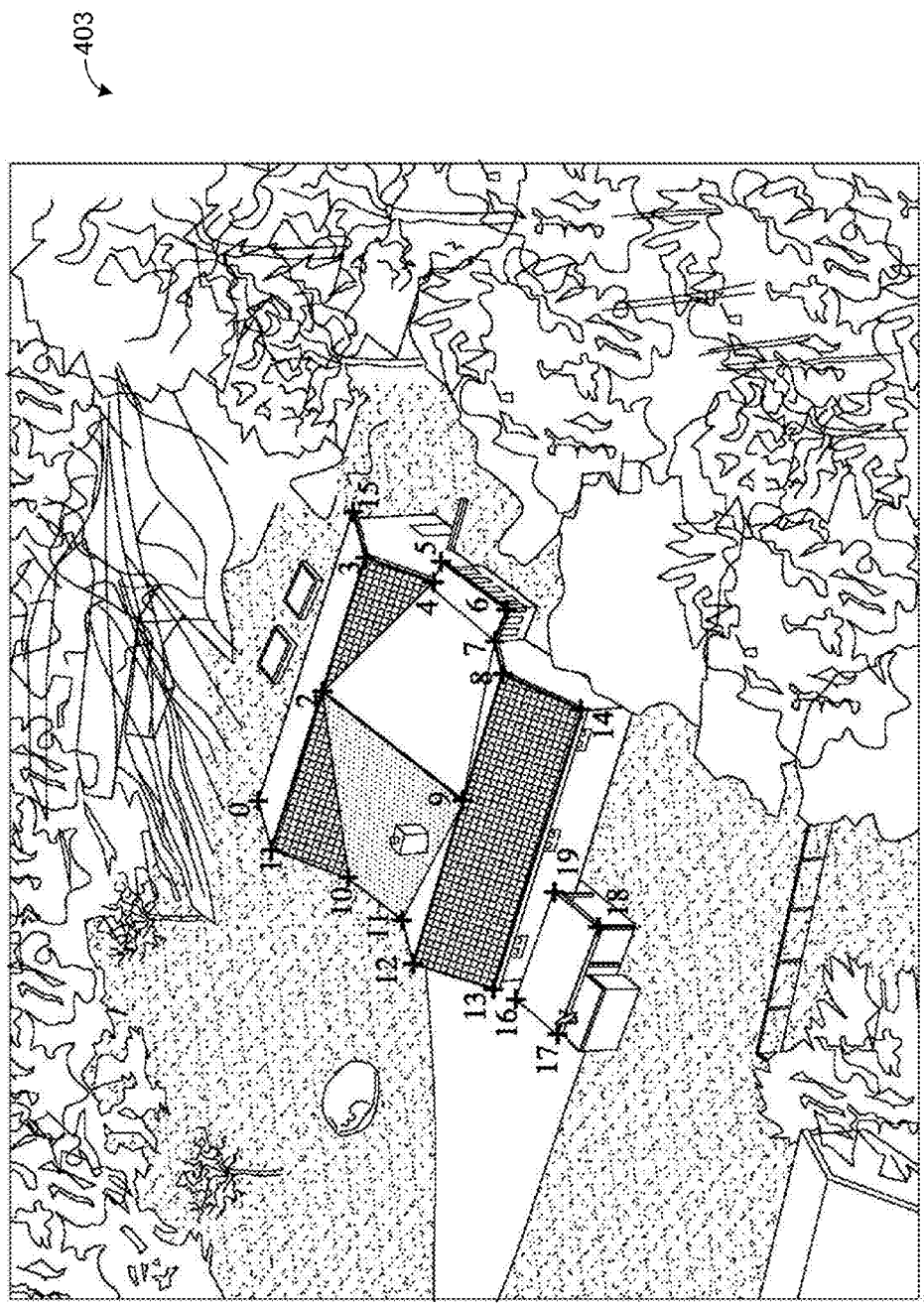
FIG. 5 is a perspective plan (oblique) view of the exemplary roof shown in FIG. 1, derived from an aerial photograph, showing identification of exemplary oblique point assignments represented by numerals on the image.

FIG. 5 shows an oblique view 403 of the same roof shown in FIG. 1, on which are also indicated twenty oblique points having point index numbers 0 through 19. However, in the present example, an orthogonal point assignment in FIG. 4 is not necessarily at the same roof location as the corresponding oblique point in FIG. 5. For example, point 5 in FIG. 4 corresponds to point 2 in FIG. 5; and point 7 in FIG. 4 corresponds to point 9 in FIG. 5. The objective in point matching is to determine such corresponding pairs of points. As mentioned above, point matching is an easy task for a human being, but a difficult one for a computer. Nevertheless, it would be advantageous for computers to perform the point matching task so that the method 200 is a fully computer-based method. The method of point matching 300 described below is a statistical method that estimates the likelihood that a certain orthogonal point from FIG. 4 matches a certain oblique point from FIG. 5.

Figure 6:
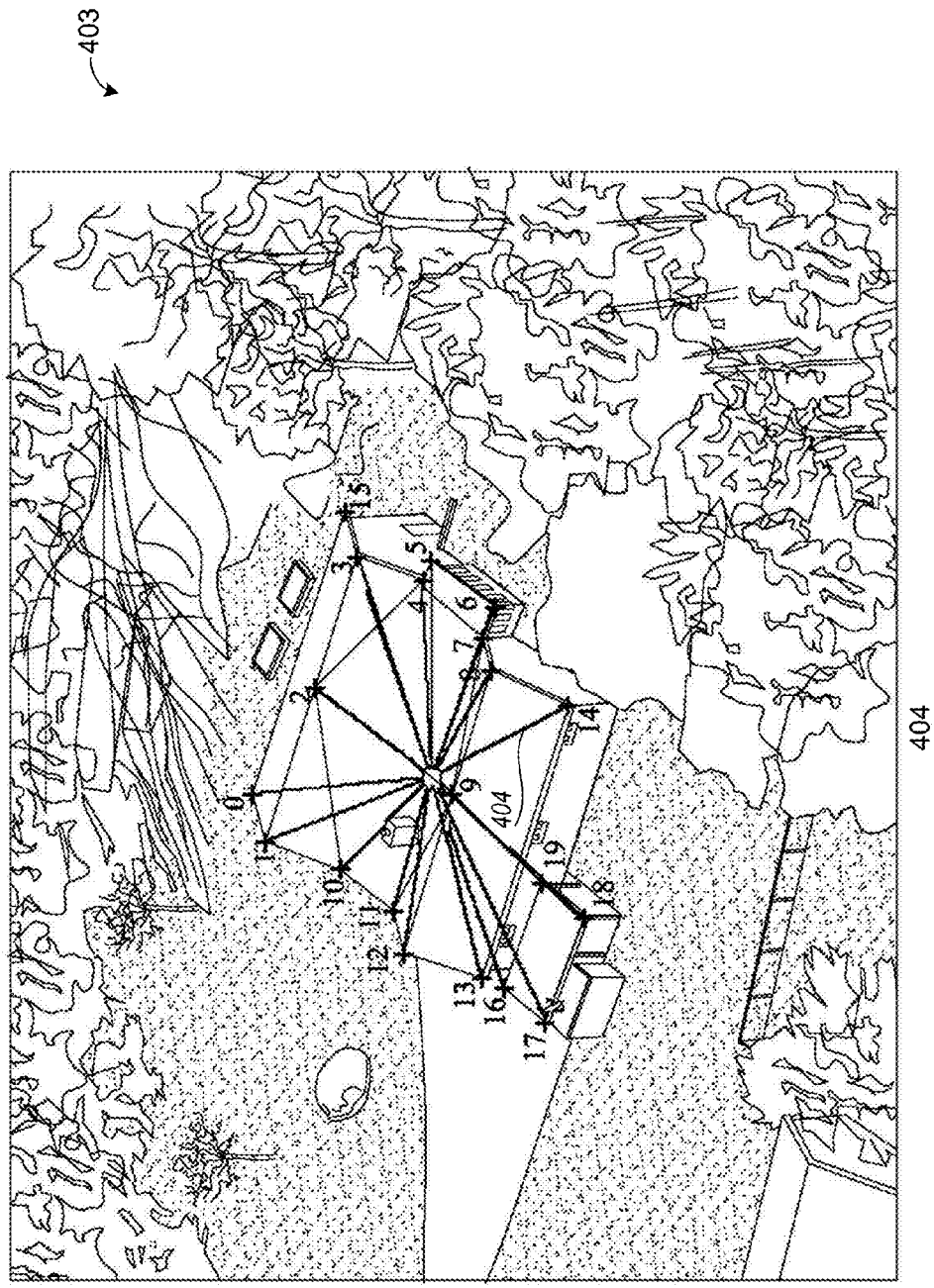
FIG. 6 is a radial plot showing a spatial distribution of an oblique point pattern corresponding to the oblique point assignments shown in FIG. 2 superimposed on the oblique view.

FIG. 6 shows an oblique radial point pattern 404 superimposed onto the oblique view 403. The oblique radial point pattern 404 includes twenty radii, each radius drawn from an origin to each one of the twenty oblique points. In this example, the origin is the central point located near point 9.

At 302, the oblique origin can be computed as the centroid, or geometric center, of a shape defined by the oblique points. The centroid can be calculated as the average of the (x,y) coordinates of the twenty oblique points. Similarly, the orthogonal origin can be computed as the centroid of a shape defined by the orthogonal points.

Figure 7:
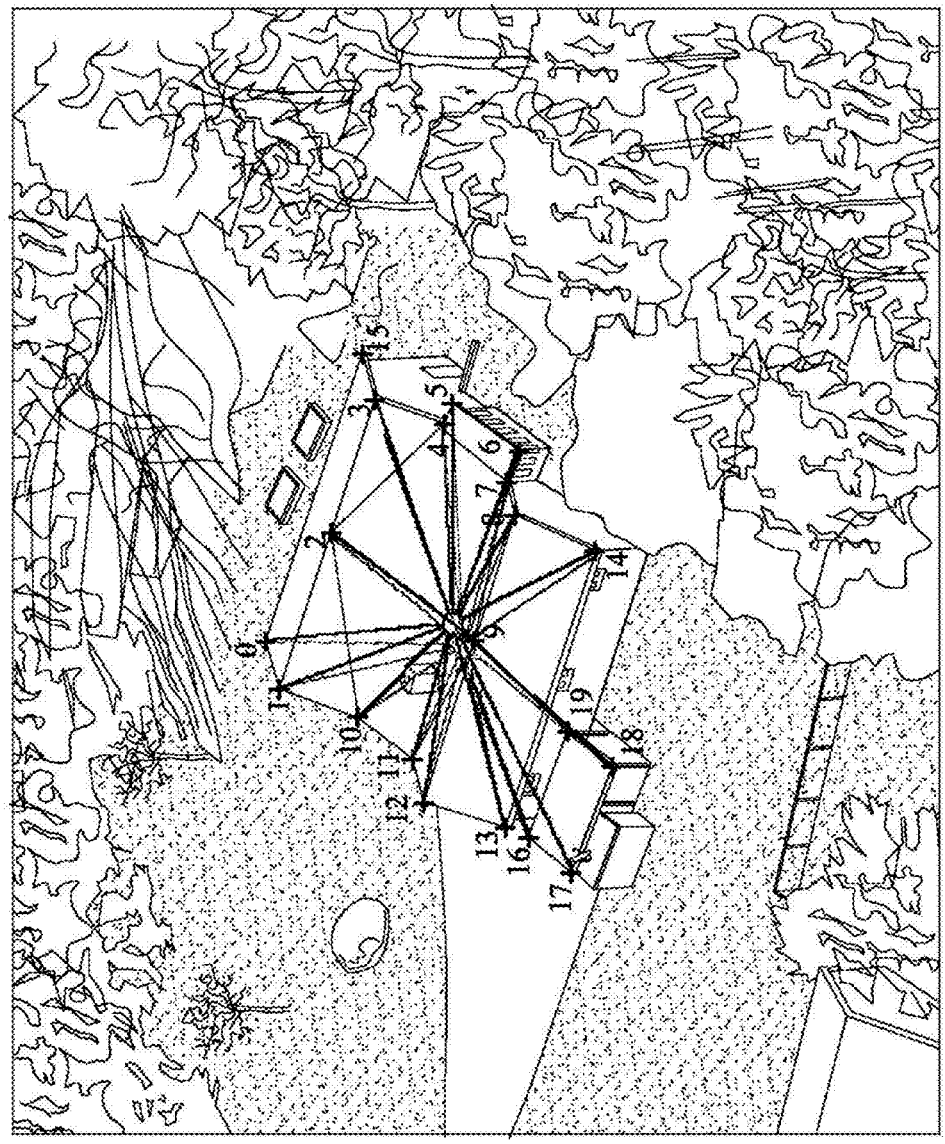
FIG. 7 is a radial plot showing the spatial distribution of the oblique point pattern shown in FIG. 6, and a spatial distribution of an orthogonal point pattern corresponding to the orthogonal point assignments, superimposed on the oblique view.

At 304, once the origin has been determined, the radial point pattern 404 can be generated for the orthogonal view 350 and the oblique view 403. FIG. 7 shows the oblique radial point pattern 404 and a corresponding orthogonal radial point pattern, both superimposed onto the oblique view 403. Because the distances between points in the oblique view 403 and the orthogonal view 350 are different, neither the origins nor the radial point patterns are the same. Therefore, the radial point patterns contain information distinguishing the oblique view 403 from the orthogonal view 350. The task of point matching can therefore be reduced to a task of pattern matching, that is, one of matching the radial point patterns.

Figure 8:
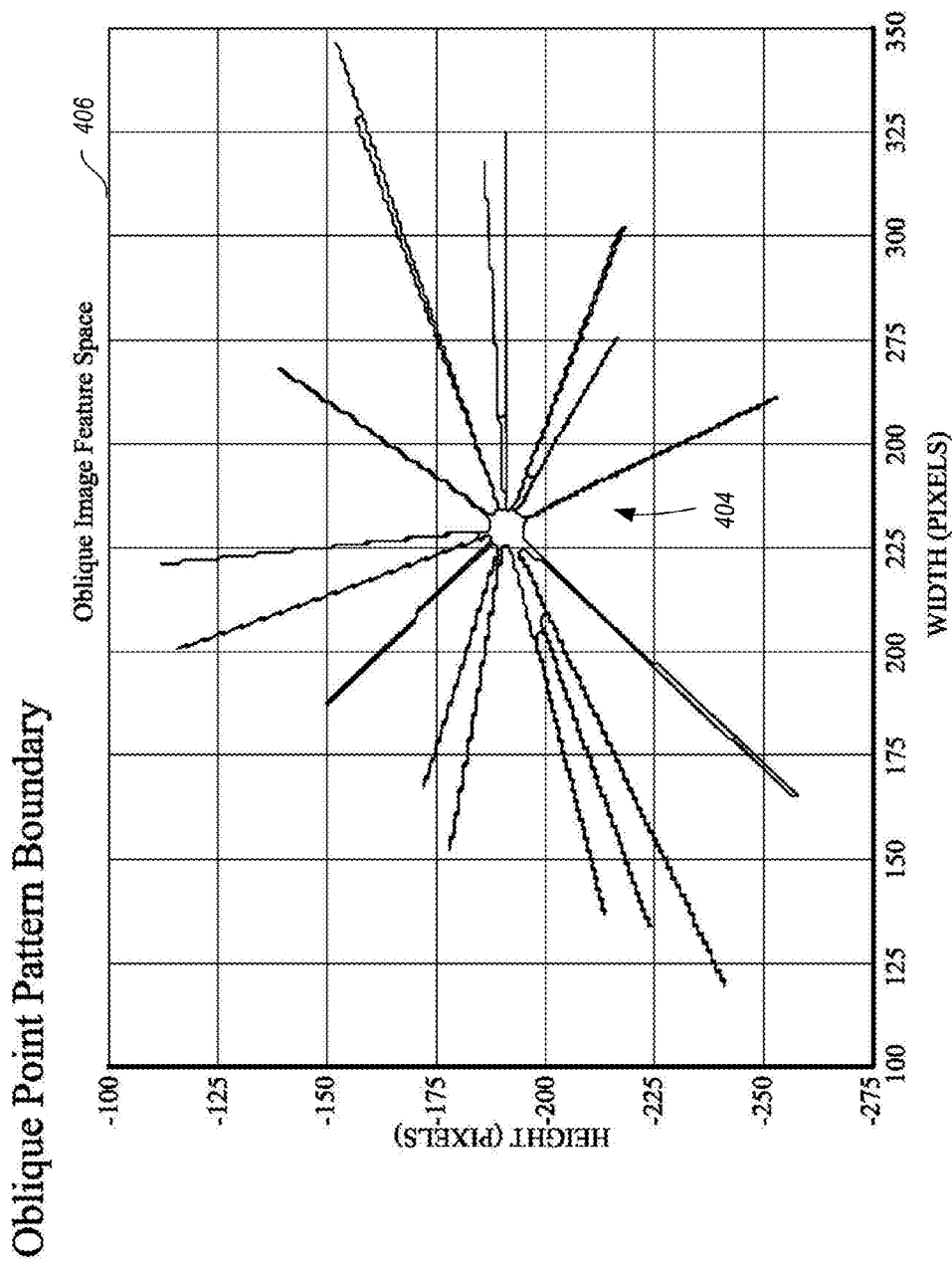
FIG. 8 is a radial plot corresponding to the oblique point pattern shown in FIG. 6.

FIG. 8 shows the radial point pattern 404 removed from the oblique view 403 and superimposed onto a pixel plot 406. In general, pixels are spatial units of an image. The pixel-space, or feature space, plot shown in FIG. 8 facilitates measuring the lengths and angles of the radii. The present inventor has recognized that the radial point pattern 404 is a type of shape signature, and that techniques used for shape matching by those of skill in the art of image processing can be applied with success to the problem of point pattern matching. Such techniques are discussed in an article entitled, "A Comparative Study on Shape Retrieval Using Fourier Descriptors with Different Shape Signatures," by Dengsheng Zhang and Guojun Lu, published in the Journal of Visual Communication and Image Representation, No. 14 (1), 2003, pp. 41-60.

Figure 9:
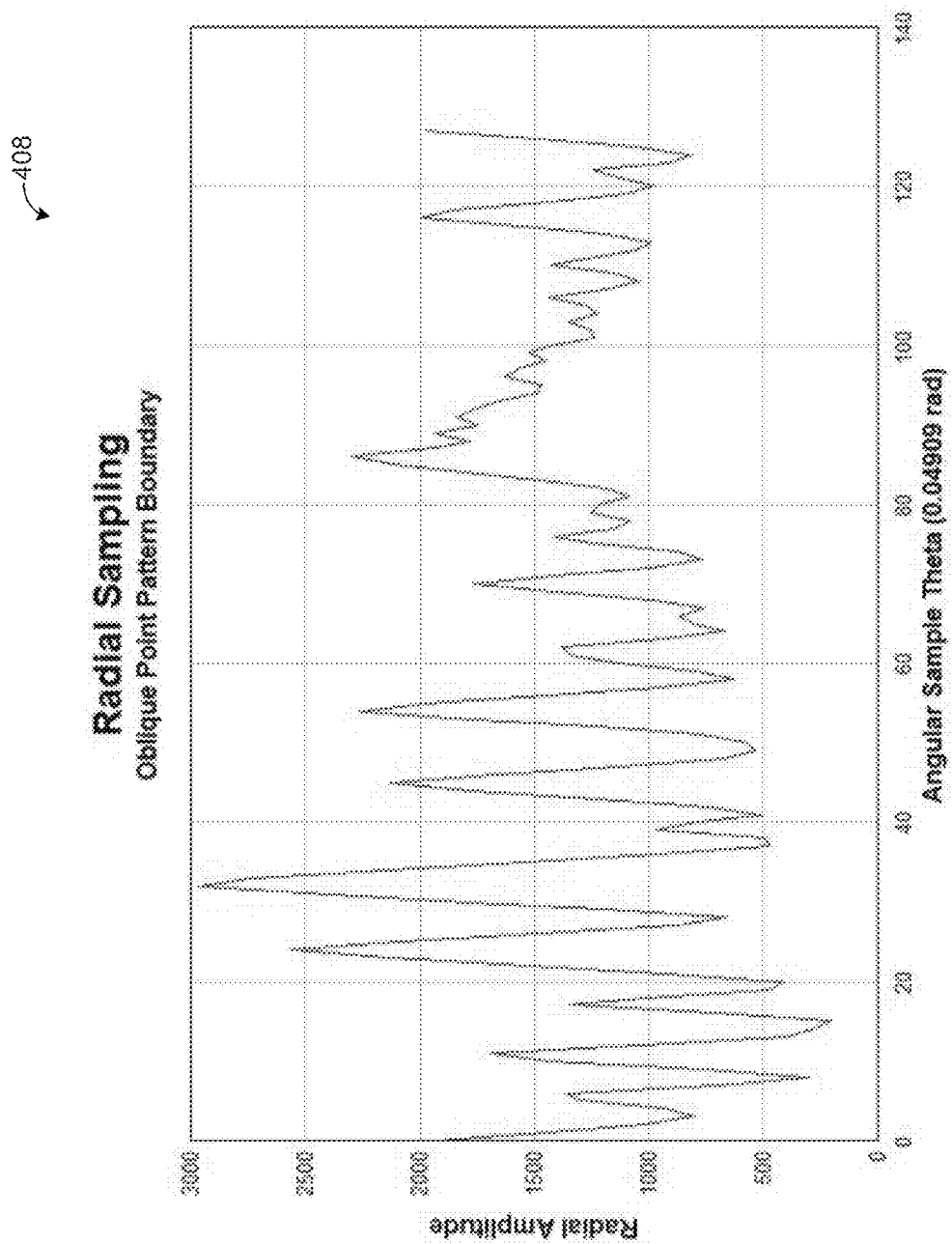
FIG. 9 is a plot of angular variational data obtained by sampling the spatial distribution shown in FIG. 8.

At 306, the statistical pattern matching algorithm can represent the radial point pattern 404 as a waveform. This can be done by radially sampling the shape signature (radial point pattern 404) to generate a plot of r vs. θ, which can be referred to by the term "angular variational data" 408. If the number of sampling points used is a power of two, a subsequent FFT will be easier. In this example, 128 sampling points were used. The radial sampling waveform that corresponds to the oblique radial point pattern 404 is shown in FIG. 9. The amplitude of the resulting waveform fluctuates between 0 and the longest radius, R.

Figure 10:
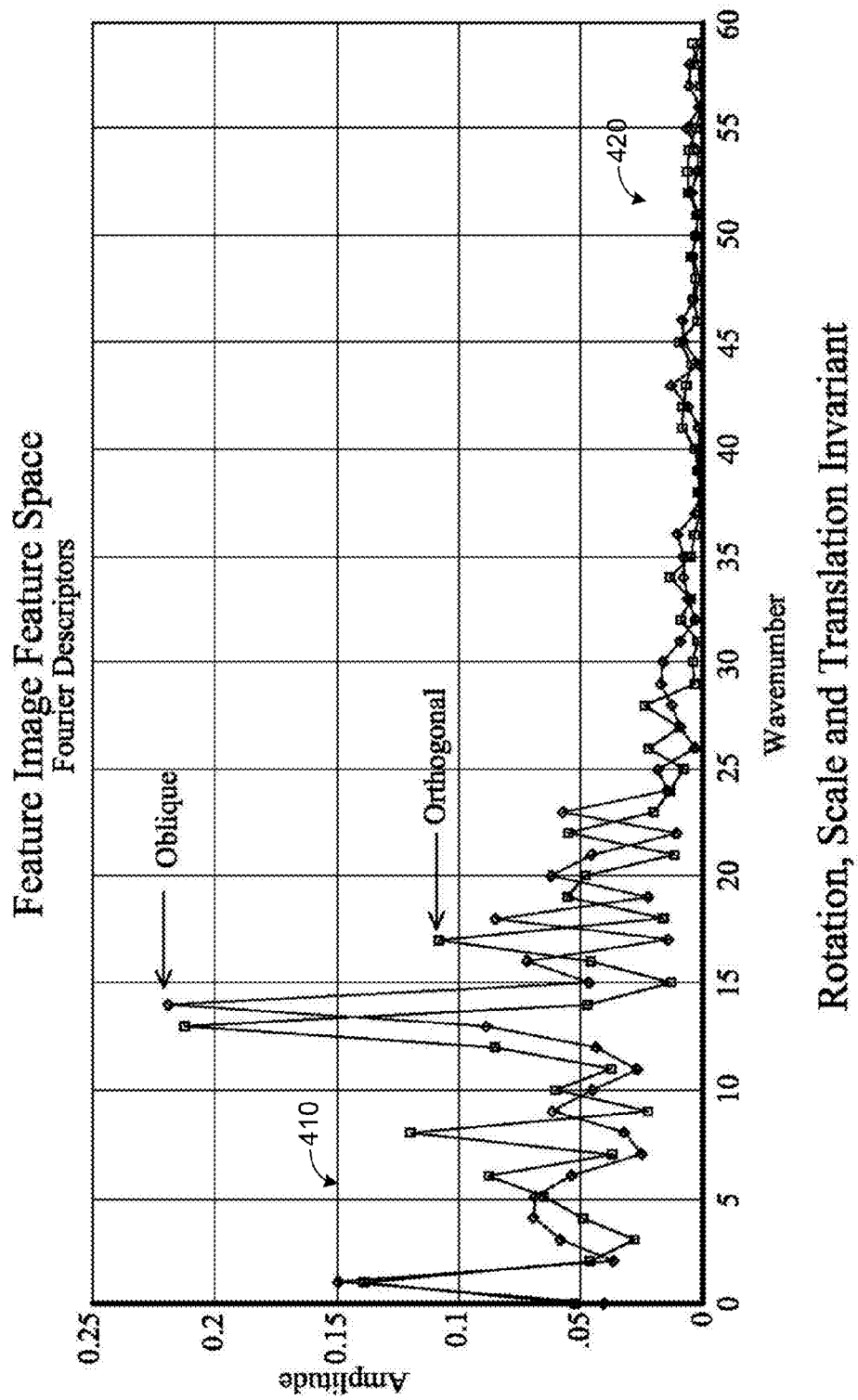
FIG. 10 is a feature space plot of the Fourier transform of the angular variational data shown in FIG. 9.
Figure 12:
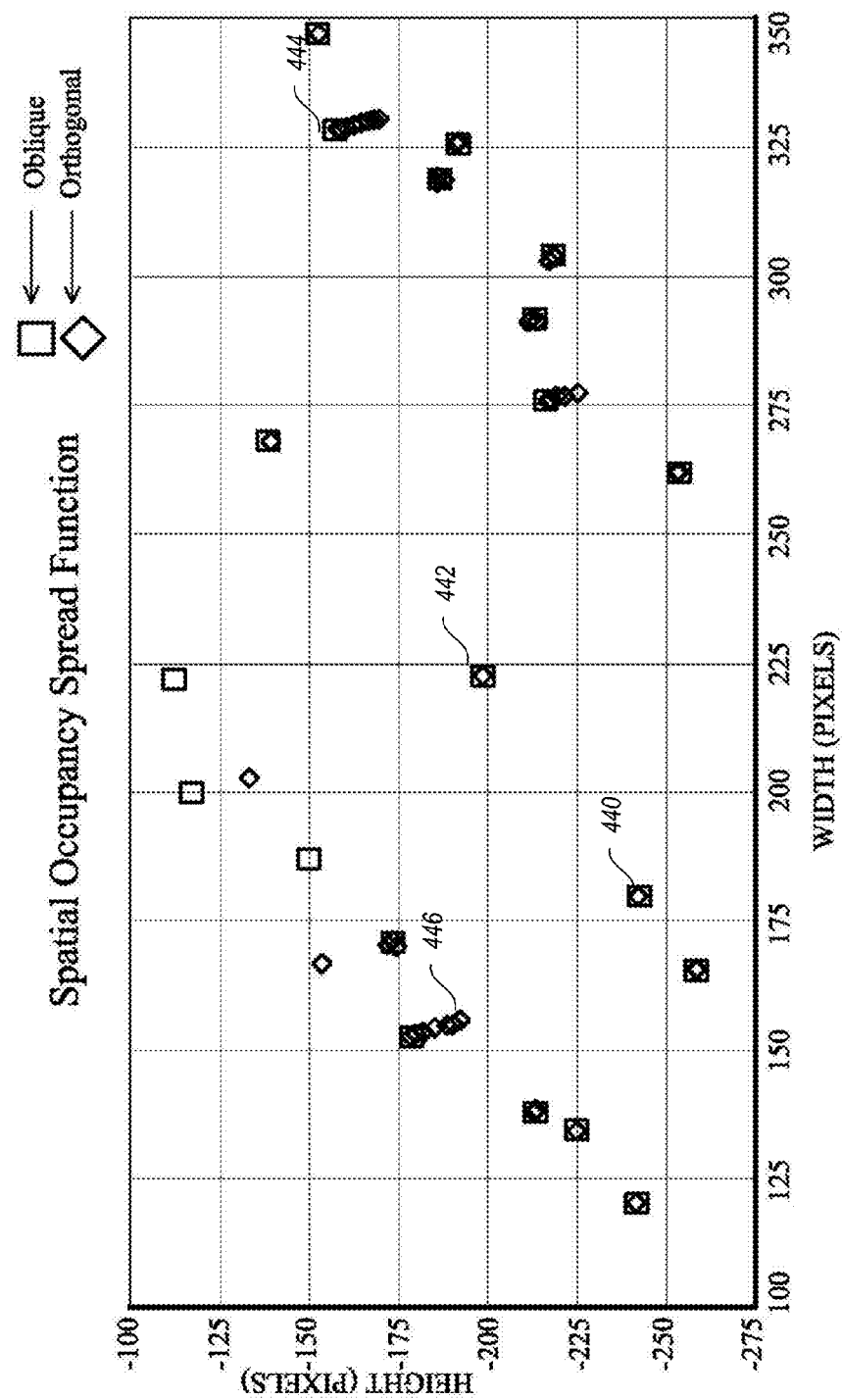
FIG. 12 is a graph of the tabular data shown in FIG. 11 representing a spatial occupancy point spread function. A larger spread indicates less chance of a point match.

At 308, a fast Fourier transform (FFT) can be performed on the angular variational data (r vs. θ) shown in FIG. 9 to yield a Fourier space plot of amplitude vs. wavenumber (k) for the oblique point pattern, as shown in FIG. 10. FIG. 10 also shows the corresponding Fourier space plot for the orthogonal radial point pattern. The data points, which are the Fourier coefficients, are Fourier descriptors of the radial point pattern shape i.e., they represent the shape of the radial point pattern in the frequency domain. The low frequency data points 410 (also low wavenumber) of the Fourier space plot shown in FIG. 10 describe general shape features of the radial point patterns (e.g., 404), while the higher frequency data points 420 describe finer details of the shape of the radial point patterns 404. An advantage of the Fourier space representations is that they are spatially normalized (with respect to radius), i.e., scale invariant, and also rotationally and translationally invariant. Consequently, pattern matching becomes mathematically easier in Fourier space than it would be in a coordinate space.

At 310, a statistical correlation between the two plots shown in FIG. 10 can be represented by a feature profile correlation function. Pattern-matching the two Fourier space plots shown in FIG. 10 thus proceeds with a calculation of a statistical correlation factor, or correlation probability, for each point pair.

Figure 11:
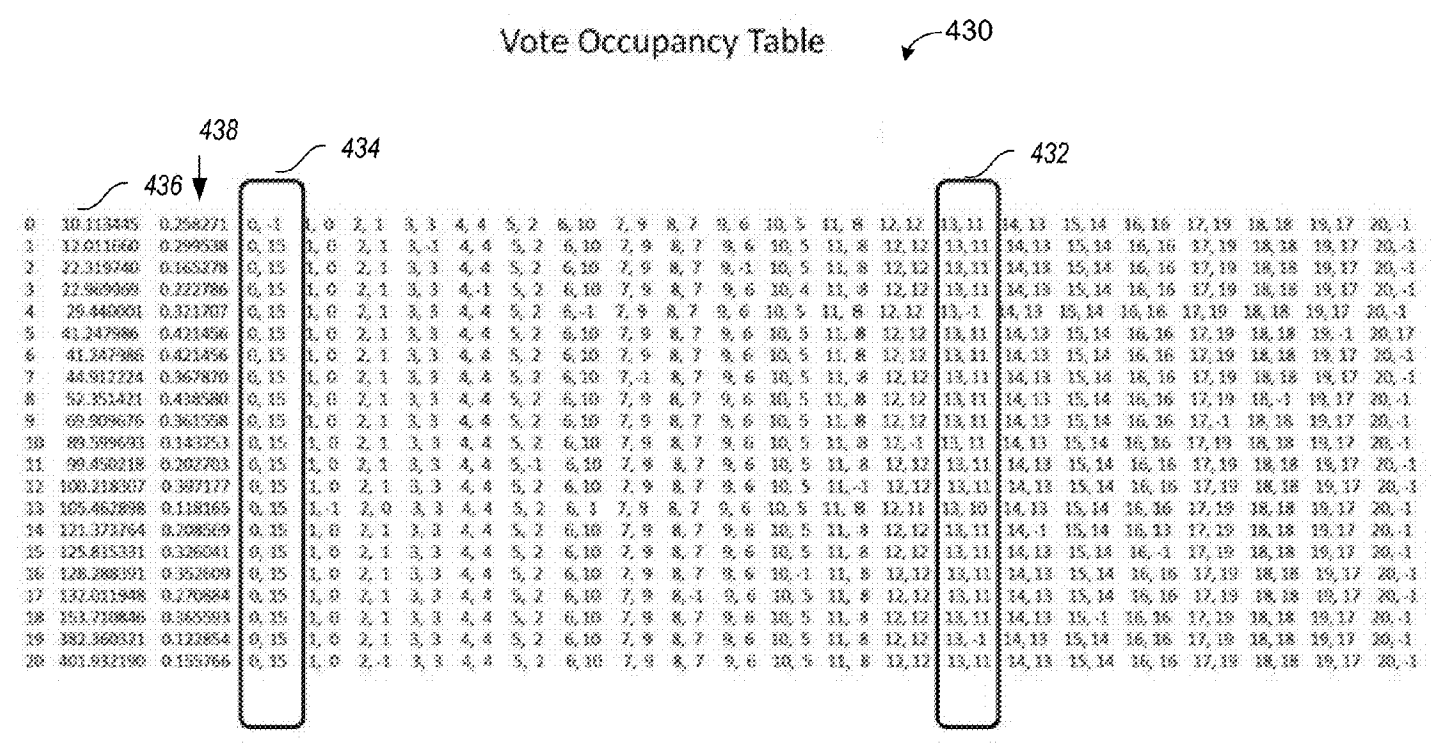

At 312, the resulting calculated correlation probabilities can be tabulated in a vote occupancy table 430, shown in FIG. 11. Rows of the vote occupancy table 430 are sorted in order of the correlation probabilities 436 such that rows having a low correlation probability are at the top of the vote occupancy table, and rows having a high correlation probability are at the bottom of the table as shown in FIG. 11. FIG. 11 shows, for example, in the fourth column, 434, that the orthogonal point indicated by index number "0" likely matches the oblique point indicated by index number "15." FIG. 11 also shows that the orthogonal point indicated by index number "13" likely matches the oblique point indicated by index number "11" according to the vote occupancy, or number of times the matched pair appears in the table. Likewise, all of the matched pairs shown, which recur frequently in the vote occupancy table are found to have a relatively high probability of being matched.

At 314, the data in the vote occupancy table can be plotted on a graph as a statistical point spread function. If the oblique and orthogonal values coincide, with little point spread, (e.g., 440, 442), they are deemed a match. However, point pairs that are not likely to be matched have a large point spread (e.g., 444, 446).

Figure 13:
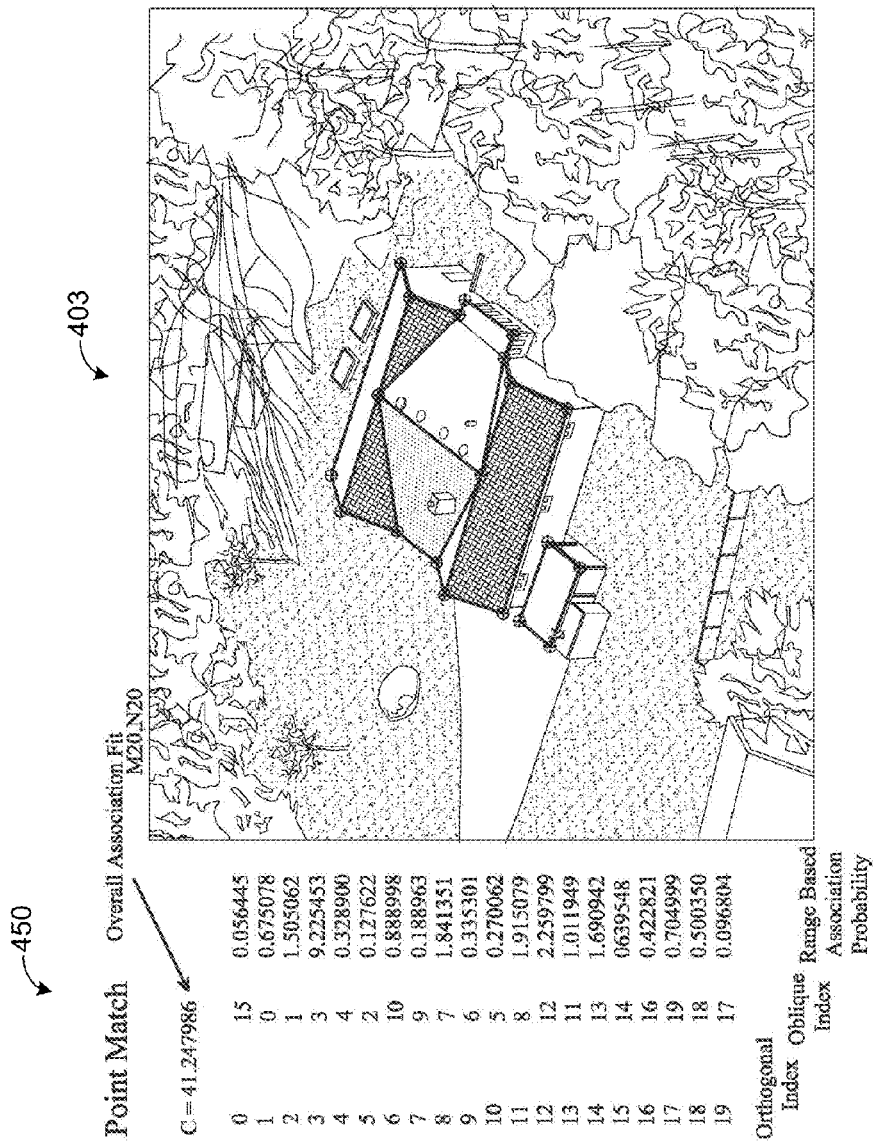
FIG. 13 is a point match table showing most likely point match pairs based on statistical data shown in FIGS. 11 and 12.

FIG. 13 shows a table 450 in which first and second columns consist of twenty point match sets (Orthogonal, Oblique), for example, (0,15), (1,0), (2,1), and so forth, indicating which pairs the statistical model has determined are likely matched. At 316, a point match probability based on a statistical variance can be determined, which values are listed in FIG. 13 as a "range based association probability." The overall association fit for the twenty sets of matched points (M=20, N=20) is determined to be C=41.24. Comparing the matched pairs to the points in FIGS. 4, 5 demonstrates that the statistical point matching method 300 was successful, because all the pairs are indeed corresponding points on the two views of the roof.

FIG. 13 also shows the oblique view 403 of the exemplary roof of FIG. 5. Overlaid on the image of the roof is a line drawing of a 3D model of the roof that was generated based on the twenty point match sets shown in the table 450 between corresponding orthogonal and oblique points selected in FIGS. 4 and 5.

The point pattern registration described in the point pattern registration and elevation computation of roof structures described in U.S. patent application Ser. No. 13/646,466 filed Oct. 5, 2012 entitled "SYSTEMS AND METHODS FOR POINT-TO-POINT REGISTRATION USING PERSPECTIVE IMAGERY FROM INDEPENDENT SOURCES WITHOUT IMAGE ACQUISITION METADATA", which is hereby incorporated by reference in its entirety, may provide initial predefined point combinations of the orthogonal and oblique point assignments on the orthogonal and oblique roof imagery described herein for use by the systems and methods for point pattern matching described herein. In particular, the point pattern registration described in application Ser. No. 13/646,466 in one embodiment is performed by the system matching locations of identified particular points of interest on an image showing a substantially orthogonal view of a roof of a building to locations of identified particular points on an image showing a perspective view of the roof using simulated perspective change data. In one embodiment, point combinations resulting from this point pattern registration described in U.S. patent application Ser. No. 13/646,466 may provide initial predefined point combinations of the orthogonal and oblique point assignments on the example orthogonal and oblique roof imagery used by the system described herein.

Also, for example, the point pattern matching system described herein may be used within, as part of, or in conjunction with the system for point pattern registration and elevation computation of roof structures described in U.S. patent application Ser. No. 13/646,466. In particular, various embodiments of the point pattern matching process described herein may be used to implement or supplement the variational point matching part of the process implemented by the system for point pattern registration and elevation computation of roof structures described in U.S. patent application Ser. No. 13/646,466.

In particular, in one embodiment, the point pattern registration part of the process described in U.S. patent application Ser. No. 13/646,466 that is performed by matching locations of identified particular points of interest on an image showing a substantially orthogonal view of a roof of a building to locations of identified particular points on an image showing a perspective view of the roof may use the processes of point pattern matching described herein instead of or as a supplement to using the simulated perspective change data described in U.S. patent application Ser. No. 13/646,466 to match the points. Elevational data of the matched points may then be generated as described in U.S. patent application Ser. No. 13/646,466 and used, for example in a process of generating a three dimensional (3D) model of the roof, such as the roof shown in the oblique and orthogonal imagery in FIGS. 1 and 2 herein.

From the foregoing it will be appreciated that, although specific embodiments have been described herein for purposes of illustration, various modifications may be made without deviating from the spirit and scope of the present disclosure. For example, the methods, systems, and techniques for point pattern matching computation discussed herein are applicable to other architectures other than the illustrated architecture or a particular Building Structure Estimation System implementation. For example, such processes and system may be utilized to generate 3D models of other structures, or objects appearing in images. Also, the methods and systems discussed herein are applicable to differing network protocols, communication media (optical, wireless, cable, etc.) and devices (such as wireless handsets, electronic organizers, personal digital assistants, portable email machines, game machines, pagers, navigation devices such as GPS receivers, etc.). Further, the methods and systems discussed herein may be utilized by and/or applied to other contexts or purposes, such as by or for solar panel installers, roof gutter installers, awning companies, HVAC contractors, general contractors, and the like, and/or insurance companies.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microprocessor-based method in a point pattern matching computation machine, the method comprising:
    obtaining orthogonal and oblique views of a structure, the views being in the form of digital images;
    selecting representative points from each view for point matching;
    performing a statistical method of point pattern matching to associate similar ones of the representative points from different views;
    deriving height data from the points by performing a transform; and
    generating a three-dimensional model from the points and the height data.

2. The microprocessor-based method of claim 1 wherein the statistical method of point pattern matching includes variational analysis to determine a probability that each one of a pair of matched points represents substantially the same location on the structure.

3. A microprocessor-based statistical method of point pattern matching, the method comprising:
    generating radial point patterns for each image;
    calculating an origin for each point pattern as a centroid of selected points;
    generating angular variational data from each point pattern;
    performing a Fourier transform of the angular variational data;
    calculating a feature space correlation function relating Fourier transforms that correspond to the point patterns;
    generating a vote occupancy table;
    determining a point match probability based on statistics of the occupancy table; and
    outputting a point match based on the determined point match probability.

4. A microprocessor-based statistical method of point pattern matching, the method comprising:
    receiving a plurality of images, the images representing different views of a structure;
    for each image of the plurality of images:
        selecting a plurality of points on the image, the plurality of points relating to features of the structure depicted on the image,
        generating a radial point pattern,
        calculating an origin for each point pattern,
        generating angular variational data from each point pattern, and
        performing a transform of the angular variational data;
    calculating a feature space correlation function relating the transforms that correspond to the point patterns for each of the images;
    generating a vote occupancy table;
    determining a point match probability based on statistics of the occupancy table; and
    outputting the point match probability.

5. The method of claim 4, wherein the transform is one of a Fourier or Fast-Fourier transform.

6. The method of claim 4, wherein the origin for each point pattern is a centroid of the selected points.

7. The method of claim 4, wherein the selecting of a plurality of points on the image in done in part by human intervention.

8. The method of claim 4, wherein the structure is a roof of building.

9. The method of claim 8, wherein the selected plurality of points relating to features of the structure depicted on the image include points at where roof lines of the structure converge.

10. The method of claim 4, wherein the vote occupancy table includes rows sorted in order of the correlation probabilities.

11. The method of claim 4, wherein the plurality of images includes at least one orthogonal and one oblique view of the structure.

12. The method of claim 4, wherein the structure is the exterior of a building.

13. The method of claim 12, wherein the selected plurality of points relating to features of the structure depicted on the image include points where the exterior edges of the structure converge.

14. The method of claim 12, wherein the selected plurality of points relating to features of the structure depicted on the image include points identifying edges of external windows of the structure.

15. The method of claim 12, wherein the selected plurality of points relating to features of the structure depicted on the image include points identifying edges of external doors of the structure.

16. The method of claim 12, wherein the selected plurality of points relating to features of the structure depicted on the image include points identifying edges of balconies of the structure.

* * * * *